US005541552A

United States Patent [19]
Suzuki et al.

[11] Patent Number: 5,541,552
[45] Date of Patent: Jul. 30, 1996

[54] METHOD OF AND APPARATUS FOR DEMODULATING A SIGNAL CONVEYED BY MULTIPLE CARRIER

[75] Inventors: Mitsuhiro Suzuki, Chiba; Makoto Natori, Saitama, both of Japan

[73] Assignee: Sony Corporation, Tokyo, Japan

[21] Appl. No.: 536,363

[22] Filed: Sep. 29, 1995

[30] Foreign Application Priority Data

Oct. 5, 1994 [JP] Japan .................................. 6-241693

[51] Int. Cl.⁶ .............................................. H04L 27/22
[52] U.S. Cl. ........................ 329/307; 329/316; 375/327; 375/376
[58] Field of Search ............................ 329/300–310, 329/316, 325; 375/324–328, 376

[56] References Cited

U.S. PATENT DOCUMENTS 5,226,081   7/1993   Hinokimoto ............................. 380/34

*Primary Examiner*—Siegfried H. Grimm
*Attorney, Agent, or Firm*—Jay H. Maioli

[57] ABSTRACT

A demodulating apparatus for receiving and demodulating a signal transmitted by use of a plurality of carriers having different frequencies employs a demodulator for frequency-analyzing a specific time waveform defined by data in one modulation symbol duration and guard times accompanying the data to provide a demodulated waveform. A correlation detector determines a correlation value between the received signal and a signal spaced apart from the received signal by a period corresponding to one modulation symbol duration. An integrating circuit integrates the correlation detected signal, and a peak-position discriminator determines a peak-position of an integrated value supplied thereto from the integrating circuit. Correction of timing and frequency offsets in the demodulation processing is carried out on the basis of the peak-position information discriminated by the peak-position discriminator.

14 Claims, 5 Drawing Sheets

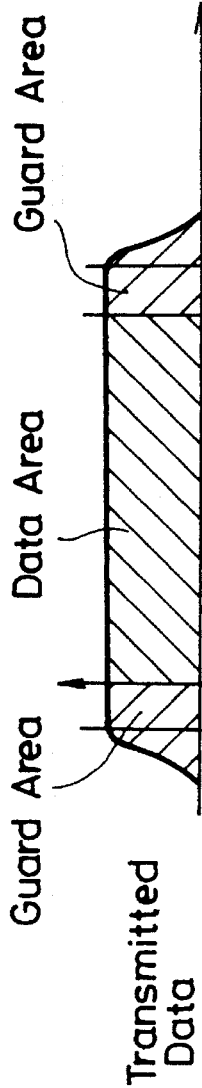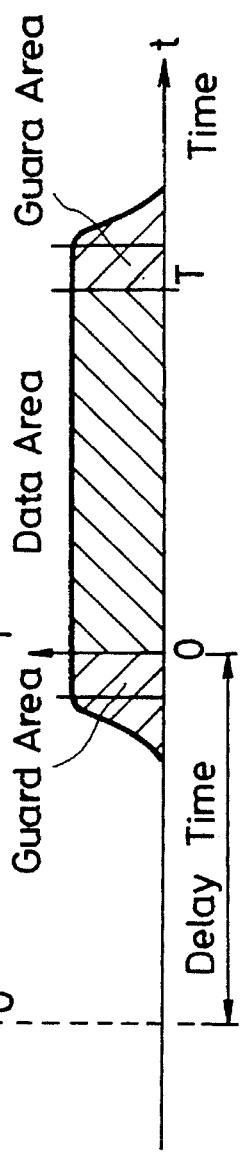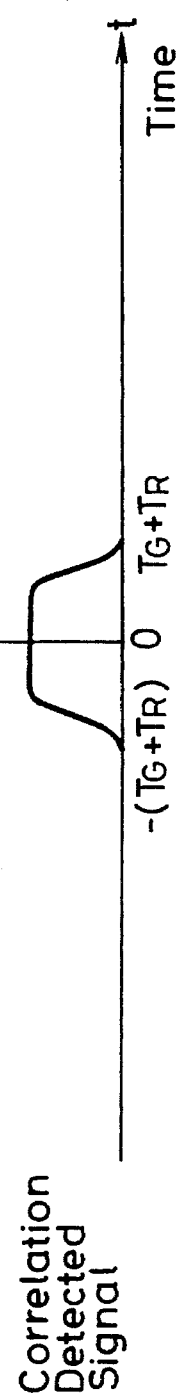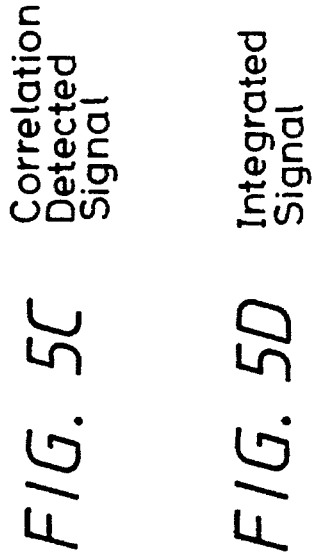

METHOD OF AND APPARATUS FOR DEMODULATING A SIGNAL CONVEYED BY MULTIPLE CARRIER

BACKGROUND OF THE INVENTION

The present invention relates to a transmission system for use in communicating between a base station and a mobile station.

A variety of mobile communication systems, such as mobile telephone or portable telephone for effecting communication between a base station and a mobile station have heretofore been put into practice. The mobile communication system is fundamentally the same communication system as for effecting communication between fixed stations.

In a mobile communication terminal such as mobile telephone or portable telephone, a received signal tends to be distorted due to the influence of so-called multipath fading. Specifically, when the multipath fading occurs, a propagation delay between paths increases to cause an intersymbol interference. As a consequence, preceding and succeeding codes overlap each other so that a transmission characteristic is degraded.

In order to satisfactorily receive a reception signal even when the transmission characteristic is degraded, a sync (synchronizing) detecting circuit formed of an adaptive equalizer or PLL (phase-locked loop) circuit has to be applied to the receiver. Therefore, the receiver becomes complex in arrangement and becomes expensive from a money standpoint.

In order to solve the aforesaid problem, the same assignee of the present application has previously proposed a communication system where information is transmitted on the basis of a phase difference between the carriers according to a so-called multiple carrier system for simultaneously transmitting a plurality of carriers (see Japanese patent application No. 6-216311). This previously-proposed communication system will be described later on in the specification.

The above-mentioned multiple carrier communication system encounters the following problems when a reception signal is received:

1) A timing at which a received wave is demodulated is difficult to be accurately synchronized with a modulation symbol duration of a transmitted signal so that an offset occurs in a demodulation timing. If the offset occurs in the demodulation timing, then an error dependent on a carrier frequency occurs in demodulated phase information. As a consequence, an error rate in judgement increases. Further, if synchronizing data is added to the transmission signal in order to synchronize the demodulation timing with the modulation symbol duration of the transmission signal, there is then the disadvantage that an amount of information to be transmitted is reduced, resulting in a transmission efficiency being lowered; and 2) A frequency offset of a received wave is difficult to be eliminated. If this frequency offset exists, then an error of a constant value occurs in demodulated phase difference information with the result that an error rate in judgement increases.

SUMMARY OF THE INVENTION

In view of the aforesaid aspect, it is an object of the present invention to provide a demodulating apparatus for use with a multiple-carrier system communication system in which a timing offset and a frequency offset can be removed with ease.

According to the present invention, there is provided a demodulating apparatus for receiving and demodulating a signal which is transmitted by use of a plurality of carriers having frequencies different from one another. This demodulating apparatus comprises demodulating means for frequency-analyzing a specific time waveform defined by data in one modulation symbol duration and guard times accompanying the data to provide a demodulated time waveform, a detecting means for detecting a correlation value between a received signal and a signal spaced apart from the received signal by a period corresponding to one modulation symbol duration, an integrating circuit for integrating a correlation detected signal and a peak-position discriminating means for discriminating a peak-position of an integrated value supplied thereto from the integrating circuit, wherein a correction in a demodulation processing is carried out on the basis of peak-position information discriminated by the peak-position discriminating means.

A sampling timing at which the sampling means samples a received signal to be demodulated is corrected on the basis of the peak-position discriminated by the peak-position discriminating means.

Further, the demodulating apparatus further includes a phase information discriminating means for discriminating the peak-position discriminated by the peak-position discriminating means and wherein a frequency offset is corrected on the basis of phase information discriminated by the phase information discriminating means.

Furthermore, information is transmitted on the basis of a phase difference between a plurality of carriers.

BRIEF DESCRIPTION OF THE DRAWINGS

FIGS. 5A through 5D are diagrams used to explain a manner in which an offset is detected.

DETAILED DESCRIPTION OF THE PREFERRED EMBODIMENT

The present invention will now be described with reference to the drawings.

Figure 1:
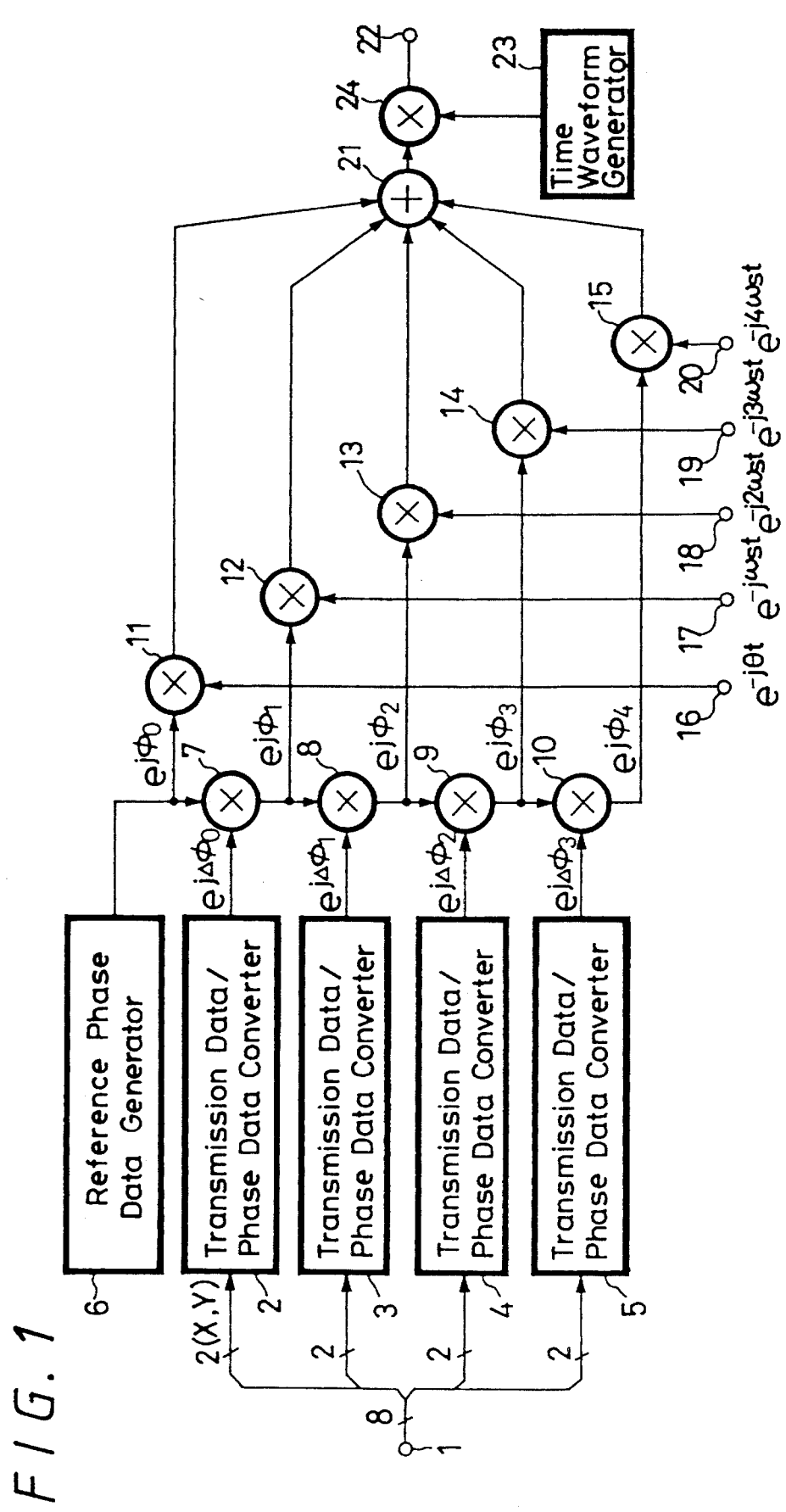
FIG. 1 is a block diagram showing a transmission system of a multiple carrier system according to the present invention.

The present invention is applied to a demodulating apparatus of a reception system of a communication system wherein digital data is transmitted and received via radio waves according to a multiple-carrier system. FIG. 1 of the accompanying drawings shows a transmission system of a multiple-carrier system.

As shown in FIG. 1, 8-bit data is sequentially supplied to a transmission data input terminal 1. This modulating apparatus processes the 8-bit data as one modulation symbol. The 8-bit data is divided into streams of 2-bit data. The divided 2-bit data are supplied to transmission data/phase data converters 2, 3, 4, 5. The transmission data/phase data converters 2 through 5 generate phase data based on the states of the 2-bit data [X, Y] supplied thereto. As the states of the 2-bit data [X, Y], there can be considered four states expressed on the following table 1. The transmission data/ phase data converters 2 through 5 generate different phase data $\Delta\phi$ at every one of the four states.

TABLE 1

| X | Y | $\Delta\phi$ |
|---|---|---|
| 0 | 0 | $\frac{\pi}{4}$ |
| 1 | 0 | $\frac{3}{4}\pi$ |
| 1 | 1 | $-\frac{3}{4}\pi$ |
| 0 | 1 | $-\frac{\pi}{4}$ |

$\Delta\phi_0$, $\Delta\phi_1$, $\Delta\phi_2$, $\Delta\phi_3$ present phase data that the four transmission data/phase data converters 2, 3, 4, 5 output.

A reference phase data generator 6 generates reference initial phase data $\phi_1$ and supplies the initial phase data $\phi_0$ to a phase multiplier 7 and a carrier multiplier 11. The phase data $\Delta\phi_0$ output from the transmission data/phase data converter 2 is supplied to the phase multiplier 7 which multiplies the initial phase data $\phi_0$ and the phase data $\Delta\phi_0$ supplied thereto to provide phase data $\phi_1$. The resultant phase data $\phi_1$ is supplied to a phase multiplier 8 and a carrier multiplier 12.

The phase data $\Delta\phi_1$ output from the transmission data/ phase data multiplier 3 is supplied to the phase multiplier 8 which multiplies the phase data $\phi_1$ and the phase data $\Delta\phi_1$ supplied thereto to provide phase data $\phi_2$. The resultant phase data $\phi_2$ is supplied to a phase multiplier 9 and a carrier multiplier 13.

The phase data $\Delta\phi_2$ output from the transmission data/ phase data converter 4 is supplied to the phase multiplier 9 which multiplies the phase data $\phi_2$ and the phase data $\Delta\phi_2$ supplied thereto to provide phase data $\phi_3$. The resultant phase data $\phi_3$ is supplied to a phase multiplier 10 and a carrier multiplier 14.

The phase data $\Delta\phi_3$ output from the transmission data/ phase data converter 5 is supplied to the phase multiplier 10 which multiplies the phase data $\phi_3$ and the phase data $\Delta\phi_3$ supplied thereto to provide phase data $\phi_4$. The resultant phase data $\phi_4$ is supplied to a carrier multiplier 15.

Therefore, the multipliers 7, 8, 9, 10 multiply the phase data $\Delta\phi_0$ to $\Delta\phi_3$ by the initial phase data $\phi_0$, in that order, to provide the phase data $\phi_1$ to $\phi_4$.

Carrier signals having different frequencies are supplied to first, second, third, fourth and fifth carrier input terminals 16, 17, 18, 19, 20, respectively. The frequencies of the carrier signals supplied to the input terminals 16, 17, 18, 19, 20 are each different by a constant angular frequency $\omega$s. Specifically, the first, second, third, fourth and fifth carrier signals are changed as shown at A, B, C, D, E in FIG. 2. In actual practice, each carrier signal is a complex number signal.

Referring back to FIG. 1, the carrier multiplier 11 multiplies the carrier signal supplied to the first carrier input terminal 16 with the initial phase data $\phi_0$. The carrier multiplier 12 multiplies the carrier signal supplied to the second carrier input terminal 17 with the phase data $\phi_1$. The carrier multiplier 13 multiplies the carrier signal supplied to the third carrier input terminal 18 with the phase data $\phi_2$. The carrier multiplier 14 multiplies the carrier signal supplied to the fourth carrier input terminal 19 with the phase data $\phi_3$. The carrier multiplier 15 multiplies the carrier signal supplied to the fourth carrier input terminal 20 with the phase data $\phi_4$. As a consequence, the respective multipliers advance the phases of the carrier signal by the amounts indicated by the phase data.

Multiplied outputs from the carrier multipliers 11 through 15 are supplied to and mixed by a mixer 21. A mixed signal output from the mixer 21 is supplied to a multiplier 24.

The multiplier 24 multiplies a transmission signal with a time waveform output from a time waveform generator 23 which will be described later on. The transmission signal multiplied with the time waveform is supplied to a transmission signal output terminal 22. The time waveform will be described in detail later.

In the modulation effected by multiplication in each of the carrier multipliers 11 to 15, assuming that T is a time during which the angular frequency $\omega$s, which is a frequency difference between carriers, is advanced by $2\pi$, then one modulation symbol duration is expressed by the following equation:

$$Tm=(1+\alpha)T \qquad (1)$$

Figure 2:
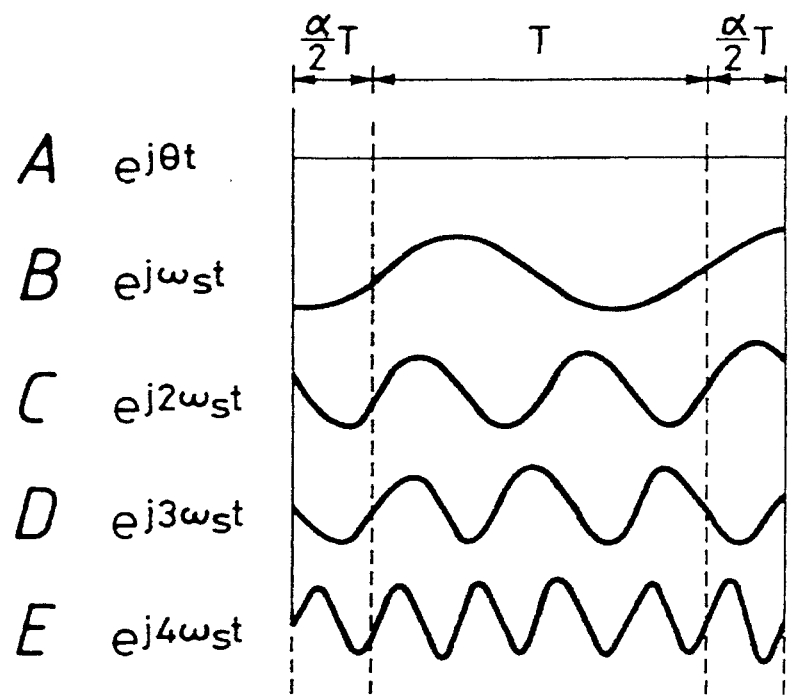
FIG. 2 is a diagram of waveforms of carriers.

Specifically, one modulation symbol duration is referred to as the time T during which the angular frequency $\omega$s is advanced by $2\pi$ is added with a spare time $\alpha$T. FIG. 2 is a diagram showing carriers obtained within one modulation symbol duration. As shown in FIG. 2, although a phase difference can be indicated only by a period T located at the central portion of one modulation symbol duration, the same modulation is carried out during periods $(\alpha/2)$T located ahead of and behind the central period T in actual practice.

Figure 3:
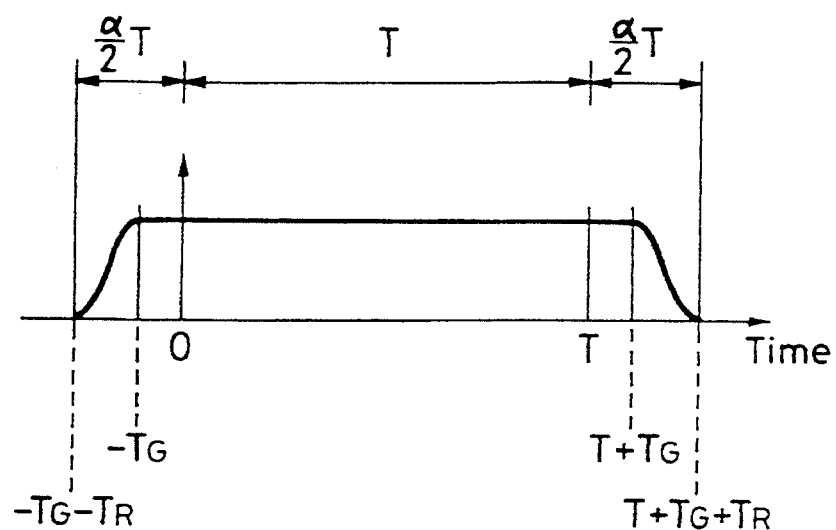
FIG. 3 is a diagram showing a time waveform.

FIG. 3 shows a time waveform output from the time waveform generator 23. This time waveform is multiplied with the transmission signal at every modulation symbol duration. A data format of one modulation symbol duration will be described. As shown by the above-mentioned equation (1), one modulation symbol duration Tm has the spare time $\alpha$T. This spare time $\alpha$T is divided by half $(\alpha/2)$T and disposed ahead of and behind the central data portion T.

In the time waveform shown in FIG. 3, the central data portion T maintains a constant level. Of the spare times $(\alpha/2)$T disposed ahead of and behind the data portion T, predetermined intervals (interval ranging from $-T_G$ to 0 and interval ranging from T to $T+T_G$) adjacent to the data portion T are assigned to guard time portions. The guard time portions have the waveforms where the same constant level as that of the data portion can be maintained. Remaining spare times are assigned to lamp portions (the interval ranging from $-T_G - T_R$ to $-T_G$ and the interval ranging from $T+T_G$ to $T+T_G+T_R$). The lamp portions have waveforms which rise up to the constant level. The rising waveform is a curve indicated by an odd function (odd-symmetrical curve with respect to a leading edge and a trailing edge) of a first-degree sine (or cosine) function.

An output signal from a transmission signal output terminal 22 at which the transmission signal with the time waveform multiplied therewith is frequency-converted into a signal of a predetermined transmission channel (transmission frequency) and supplied to an antenna (not shown), from which it is transmitted via radio waves.

A demodulating apparatus for receiving and demodulating a transmitted signal according to the present invention will be described with reference to FIG. 4.

Figure 4:
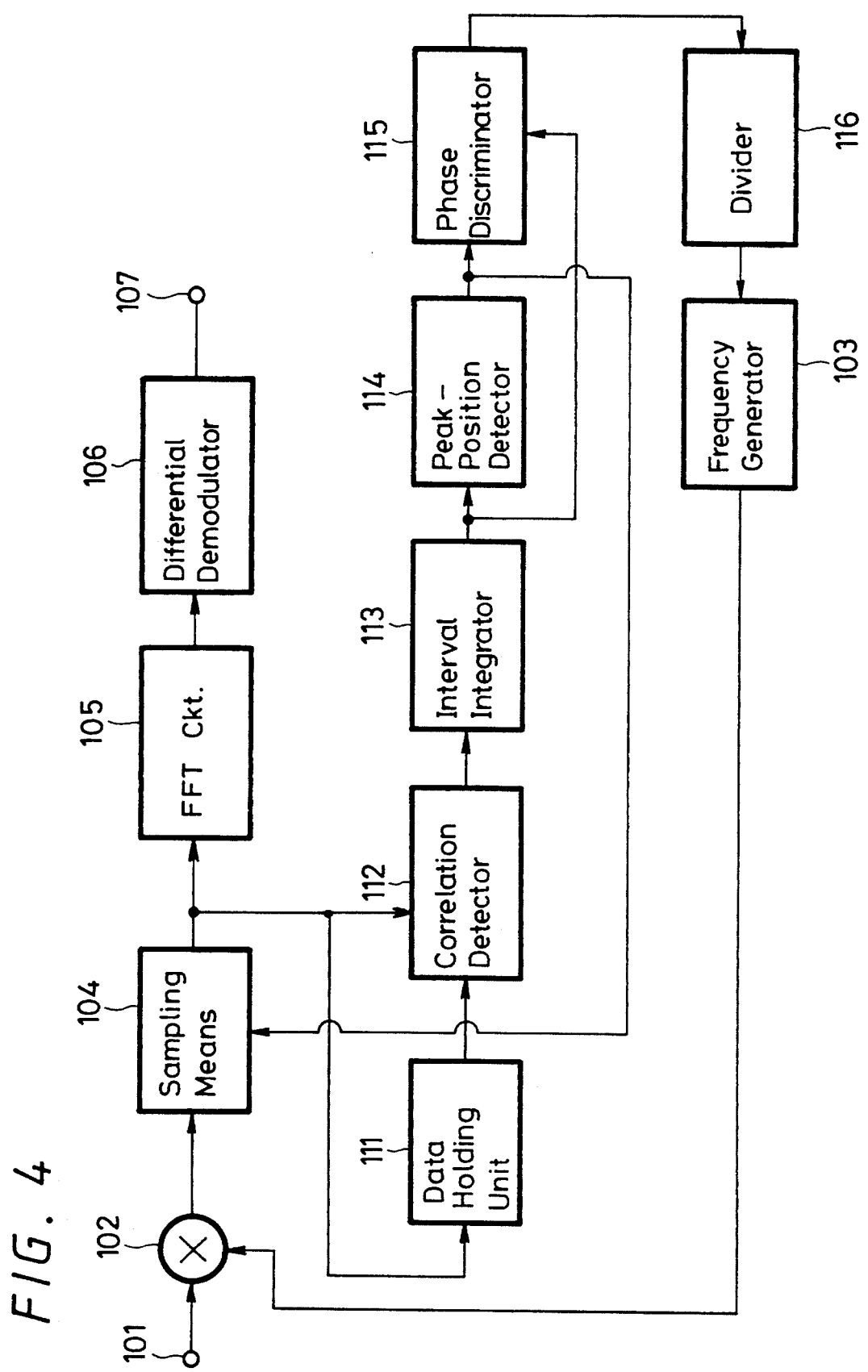
FIG. 4 is a block diagram showing a demodulating apparatus according to the present invention.

As shown in FIG. 4, a reception signal is supplied to an input terminal 101. The reception signal supplied to the input terminal 101 is supplied to a frequency converter 102 serving as a frequency mixer, in which it is mixed with a frequency signal supplied thereto from a frequency generator 103 to demodulate the signal, which was frequency-converted to the signal of the transmission channel, to provide a baseband signal.

The baseband signal with multiple carriers output from the frequency converter 102 is supplied to a sampling means (sampler) 104 and the baseband signal is thereby sampled at a predetermined timing. A sampled received signal is supplied to a fast Fourier transform circuit (hereinafter referred to as a FFT circuit) 105. The FFT circuit 105 performs a calculation of fast Fourier transform to obtain phase information, which was demodulated from a plurality of carriers and superimposed upon the carriers, at every carrier during each modulation symbol duration by use of data of predetermined sampling points. The phase information of every carrier is supplied to a differential demodulator 106 which then detects phase differences among the carriers. Then, each detected phase difference is demodulated to 2-bit data in accordance with the conversion rule expressed in table 1. Four 2-bit data obtained from four phase differences among the five carriers are synthesized as 8-bit data. Then, the demodulated 8-bit data from the differential demodulator 106 is supplied to an output terminal 107.

The received signal sampled by the sampling means 104 is supplied to a data holding unit 111, in which it is held for a time corresponding to the data portion transmission time T within one modulation symbol duration. The signal held and delayed by the time T and a real-time signal are supplied to a correlation detector 112.

The correlation detector 112 detects a correlation between the signal delayed by the time T and the real-time signal. In the transmission system according to the present invention, since the carrier is a complex signal, when a correlation is detected, the signal delayed by T and the real-time signal are multiplied in complex conjugation.

A correlation detected signal from the correlation detector 112 is supplied to an interval integrator 113. The interval integrator 113 integrates the correlation detected signal and supplies an integrated value to a peak-position discriminator 114. The peak-position discriminator 114 discriminates the peak position of the integrated value.

Specifically, the peak-position discriminator 114 discriminates, on the basis of the timing of the discriminated peak position, a boundary between the data portion and the guard time portion of the transmitted signal. If the sampling timing of the sampling means 104 is displaced from the discriminated position, then the peak-position discriminator 114 supplies a command signal to the sampling means 104, whereby the sampling means 104 corrects a sampling timing and a timing offset.

The data indicative of the peak position of the integrated value discriminated by the peak-position discriminator 114 is supplied to a phase discriminator 115. The phase discriminator 115 discriminates the phase of the integrated value of the peak position output from the interval integrator 113. Then, a discriminated phase value is supplied to a divider 116 which performs normalization by dividing the phase value supplied thereto by the data portion time T. Then, a divided value is supplied to the frequency generator 103, in which the frequency offset is corrected in response to a phase value indicated by the divided value.

A manner in which the frequency offset is corrected will be described with reference to FIGS. 5A through 5D.

Since a signal transmitted by the transmission system according to the present invention is multiplied with a time waveform shown in FIG. 5A at every modulation symbol duration, the change of such reception level is detected at every modulation symbol duration.

FIG. 5B shows the signal delayed by the data holding unit 111 by the time corresponding to the data portion transmission time T within one modulation time. If a starting portion 0 of the data portion of the delayed signal is taken as a reference, then the correlation detected signal detected by the correlation detector 112 becomes a signal as shown in FIG. 5C. Specifically, if the received frequency agrees with the transmitted frequency, then a data edge of the starting portion 0 of the data portion and a data edge of the ending portion T of the data portion are in agreement with each other. As a result, only data of the guard time portion $T_G$ and the ramp portion $T_R$ remain as the correlation detected signal.

Then, by integrating the correlation detected signal by the interval (i.e., duration ranging from $-[T_G+T_R]$ to $T_G+T_R$ shown in FIG. 5C) of the guard time portion $T_G$ and the ramp portion $T_R$, there can be obtained an integrated signal where the starting portion 0 of the data portion of the delayed signal becomes a peak position as shown in FIG. 5D. If a difference between the timing of the detected peak position and the timing judged as the starting portion 0 of the data portion is greater than the time T or less than the time T, then the sampling timing and the timing offset are corrected by a resultant difference, then transmitted data can be sampled at accurate timing.

Since the timing offset is corrected by use of the time waveform superimposed upon the transmitted signal, even when timing detection data such as a synchronizing signal is not superimposed upon the transmitted signal, timings at which received waves are demodulated can be precisely synchronized with each other. Therefore, it becomes possible to receive transmitted data with high transmission efficiency by the simple arrangement without timing detection data such as a synchronizing signal.

If the baseband signal output from the frequency converter 102 in FIG. 4 has the frequency offset, then the data edge of the starting portion 0 of the data portion and the data edge of the ending portion T of the data portion are not in agreement with each other and the phase of the data at the ending portion T of the data portion is rotated by the offset amount of the frequency. Accordingly, the phase discriminator 115 discriminates the phase of the integrated value of the peak position and the divider 116 divides the discriminated phase value by the time T to thereby normalize phase information, whereby the offset amount of the frequency is detected as phase information and the frequency offset can be eliminated. Therefore, the received frequencies can be easily synchronized and a reception processing can be carried out accurately by the simple arrangement.

A manner in which the timing offset and the frequency offset are corrected by the circuit according to the present invention will be described with reference to the following equations.

Initially, let it be assumed that $\delta$ is a timing offset value and that $\sigma$ is a frequency offset value. Then, the received signal is expressed by the following equation (2):

$$y'(t) = u(t+\delta)x'(t+\delta)$$

$$x'(t) \equiv x(t)e^{-j\sigma t} \quad (2)$$

A correlated value Z'(t) spaced apart by the time T is expressed by the following equation (3):

$$Z'(t) = y'(t) \times y'^*(t+T) \quad (3)$$
$$= u(t+\delta) \cdot u(t+T+\delta) \cdot x(t+\delta) \times x^*(t+T+\delta) \times e^{j\sigma T}$$
$$= z(t+\delta)e^{j\sigma T}$$

A manner in which the value of Z(t) is obtained will be described below. Initially, $\omega(t)$ is defined by the following equation (4):

$$\omega(t) \equiv u(t) \times u(t+T)$$

$$\omega(t) \equiv \begin{cases} 0, & |t| > T_G + T_R \\ 1, & |t| < T_G \\ \frac{1}{2}\left[1+\sin\left\{\frac{2\pi}{T_R}\left(t+T_G+\frac{1}{2}T_R\right)\right\}\right], \\ \quad -(T_G+T_R) \leq t \leq -T_G \\ \frac{1}{2}\left[1-\sin\left\{\frac{2\pi}{T_R}\left(t-T_G-\frac{1}{2}T_R\right)\right\}\right], \\ \quad T_G \leq t \leq T_G+T_R \end{cases} \quad (4)$$

Since $\omega_s T=2\pi$, the following equation (5) is defined:

$$x(t+T) = \sum_{l=0}^{4} e^{j\phi l} e^{-jl\omega_s(t+T)} \quad (5)$$
$$= \sum_{l=0}^{4} e^{j\phi l} e^{-jl\omega_s t}$$
$$= x(t)$$

Therefore, we have the following equation (6):

$$Z(t) = u(t)u(t+T)x(t)x^*(t+T) \quad (6)$$
$$= \omega(t) \times |x(t)|^2$$

Since an expectation $E\{|x(t)|^2\}=1$, we have the following equation (7):

$$E\{Z(t)\}=\omega T \quad (7)$$

On the other hand, an expectation which results from integrating a correlated value Z'(t) by a duration of 2 $(T_G+T_R)$ is expressed by the following equation (8):

$$V(\gamma) = E\left\{\int_{-(T_G+T_R)+\gamma}^{T_G+T_R+\gamma} Z'(t)dt\right\} \quad (8)$$
$$= e^{j\sigma T}\int_{-(T_G+T_R)+\gamma}^{T_G+T_R+\gamma} \omega(t+\delta)dt$$
$$= e^{j\sigma T} \times S(\gamma+\delta)$$

$$\left(S(\gamma+\delta) \equiv \int_{-(T_G+T_R)+\gamma}^{T_G+T_R} \omega(t+\delta)dt\right)$$

$S(\gamma)$ takes the maximum value when $\gamma=0$. Therefore, if $\gamma$ obtained when the above-mentioned function is at its peak is taken as $\gamma_{max}$, then $\delta=-\gamma_{max}$. Further, phase information is constantly contained in the integrated value $V(\gamma)$ and can be easily separated from the integrated value by the following equation (9):

$$\delta = \frac{Arg\{V(\gamma)\}}{T} \quad (9)$$

The timing offset value $\delta$ and the frequency offset value $\sigma$ are obtained as described above. Since the timing offset value $\delta$ uses the expectation, if the sampling means samples many more received signals to be demodulated, then a detection accuracy can be improved.

While the frequency offset is corrected by directly correcting the frequency signal as described above, the present invention is not limited thereto and the following modification also is possible.

Figure 6:
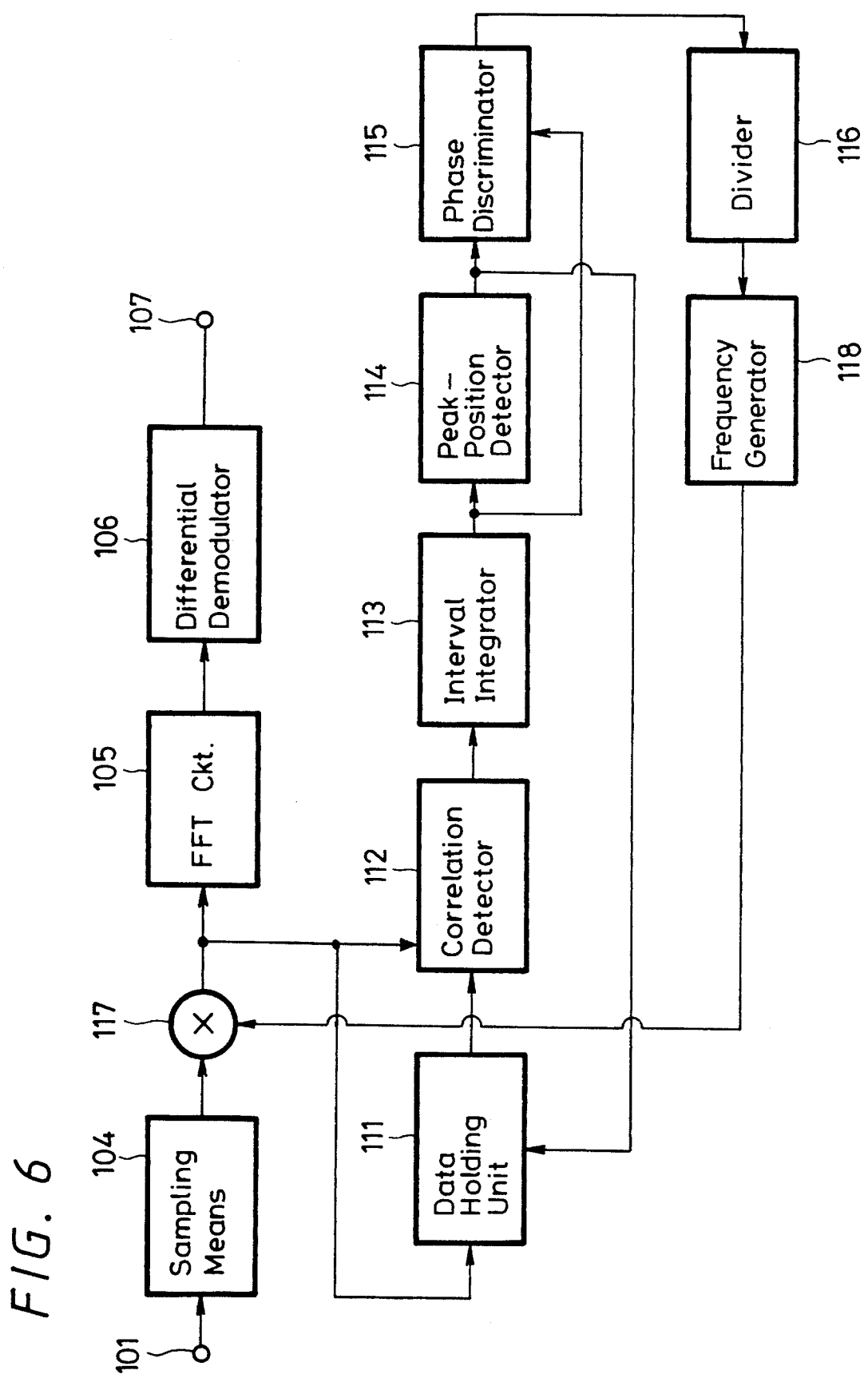
FIG. 6 is a block diagram showing a reception system according to the present invention.

FIG. 6 is a block diagram showing a modified example. In FIG. 6, elements and parts identical to those of FIG. 4 are marked with the same references and therefore need not be described in detail. As shown in FIG. 6, the phase value output from the divider 116 is supplied to a frequency generator 118. Then, an output signal from the frequency generator 118 is supplied to a multiplier 117, in which it is multiplied with the sampled value so as to correct the frequency offset.

Further, while the present invention is applied to the multiple-carrier system for transmitting data on the basis of phase differences among a plurality of carriers to be transmitted as described above, a principle of the present invention can be applied to a multiple-carrier system communication system of other systems so long as communication systems of other systems transmit data with a similar time waveform superimposed thereon.

According to the present invention, the offset information of the received signal can be detected from the discriminated peak position and the frequency offset can be corrected. Therefore, it becomes possible to accurately demodulate the received signal without superimposing a synchronizing signal for detecting offset in the transmitted data.

Further, the sampling timing can be corrected by using the peak position information as the offset. Hence, the error rate caused by the offset of the sampling timing can be lessened.

Furthermore, since the frequency offset can be corrected by using the phase information of the peak position, the error rate caused by the frequency offset can be lessened.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A demodulating apparatus for demodulating transmitted data by receiving a transmitted signal wherein predetermined bits of said transmitted data are used as a modulation symbol, a plurality of carriers having different frequencies are modulated, and a predetermined time waveform is multiplied with a modulated signal whose modulating symbol is composed of said predetermined bits, said demodulating apparatus comprising:

a sampling circuit for sampling a received signal at a timing corresponding to said modulation symbol and outputting a sampled received signal;

a demodulating circuit for demodulating data by frequency-analyzing said sampled received signal output from said sampling circuit;

correlation detecting means for detecting a correlation between said sampled received signal output from said sampling circuit and a delayed sampled received signal obtained by delaying said sampled received signal output from said sampling circuit by a determined time corresponding to a duration of said modulation symbol;

an integrating circuit for integrated a signal output from said correlation detecting means; and a peak-position discriminating circuit for discriminating a peak-position of a signal output from said integrating circuit, wherein a correlation in demodulating said received signal is carried out in response to peak-position information discriminated by said peak-position discriminating circuit.

2. A demodulating apparatus according to claim 1, wherein a sampling timing at which said sampling circuit samples said received signal is controlled in response to said peak-position information discriminated by said peak-position discriminating circuit.

3. A demodulating apparatus according to claim 1, further comprising a phase information discriminating circuit for discriminating a phase difference between said peak-position discriminated by said peak-position discriminating circuit and the signal output from said integrating circuit, wherein a frequency offset of said received signal is corrected in response to phase information discriminated by said phase difference information discriminating circuit.

4. A demodulating apparatus according to claim 3, further comprising a frequency oscillator supplied with said phase difference information from said phase information discriminating circuit for for producing a signal with a frequency corresponding to said phase difference information and a mixer supplied with said signal from said frequency oscillator and said received signal, wherein an output signal of said mixer is supplied to said sampling circuit.

5. A demodulating apparatus according to claim 3, further comprising a frequency oscillator supplied with said phase difference information from said phase information discriminating circuit for producing a signal with a frequency corresponding to said phase difference information and a mixer supplied with said signal from said frequency oscillator and sampled received signal from said sampling circuit and supplying an output signal of said mixer to said demodulating circuit.

6. A demodulating apparatus according to claim 4, further comprising divider means, whereby said phase difference information is normalized by dividing said phase difference information discriminated by said phase information discriminating circuit by a predetermined time corresponding to said modulation symbol duration and an oscillation frequency of said frequency oscillator is controlled on the basis of normalized phase difference information.

7. A demodulating apparatus according to claim 5, further comprising divider means, whereby said phase difference information is normalized by dividing said phase difference information discriminated by said phase information discriminating circuit by a predetermined time corresponding to said modulation symbol duration and an oscillation frequency of said frequency oscillator is controlled on the basis of normalized phase difference information.

8. A method of demodulating transmitted data by receiving a transmitted signal wherein predetermined bits of said transmitted data are used as a modulating symbol, a plurality of carriers having different frequencies are modulated, and a predetermined time wave form is multiplied with a modulated signal whose modulating symbol is composed of said predetermined bits, said method comprising the steps of:

sampling a received signal at a sampled timing corresponding to said modulating symbol and outputting a sampled received signal;

demodulating data by frequency-analyzing said sampled received signal in response to said modulation symbol;

detecting a correlation between said sampled received signal output at said sampling step and a delayed received signal obtained by delaying said sampled received signal output from said sampling step by a predetermined time corresponding to said modulation symbol duration;

integrating a signal output from said correlation detecting step; and discriminating a peak-position of a signal output from said integrating step, wherein a correlation in demodulating said received signal is carried out on the basis of peak-position information discriminated by said step of discriminating a peak-position.

9. A method according to claim 8, wherein the sampling timing at which said sampling step samples said received signal is controlled on the basis of said peak-position information discriminated by said peak-position discriminating step.

10. A method according to claim 8, further comprising the step of discriminating a phase difference between said peak-position discriminated by said peak-position discriminating step and the signal output from said integrating step, wherein a frequency offset of said received signal is corrected on the basis of phase difference information discriminated by said phase difference discriminating step.

11. A method according to claim 10, further comprising a step of producing a frequency-oscillating signal on the basis of said phase difference information obtained from said phase difference discriminating step and outputting a signal with a frequency corresponding to said phase difference information and a mixing step supplied with said signal from said frequency-oscillating step and said received signal and supplying an output signal of said mixing step to said sampling step.

12. A method according to claim 10, further comprising a step of producing a frequency-oscillating signal on the basis of said phase information obtained from said phase difference discriminating step and outputting a signal with a frequency corresponding to said phase difference information and a mixing step supplied with an output signal from said frequency-oscillating step and an output signal from said sampling step and supplying an output signal of said mixing step to said demodulating step.

13. A method according to claim 11, wherein said phase information is normalized by dividing said phase information discriminated by said phase difference discriminating step by a predetermined time corresponding to said modulation symbol duration and an oscillation frequency of said frequency-oscillating step is controlled on the basis of a normalized phase information.

14. A method according to claim 12, wherein said phase information is normalized by dividing said phase information discriminated by said phase difference discriminating step by a predetermined time corresponding to said modulation symbol duration and an oscillation frequency of said frequency-oscillating step is controlled on the basis of a normalized phase information.

* * * * *